(12) United States Patent
Hirashima

(10) Patent No.: US 11,858,355 B2
(45) Date of Patent: Jan. 2, 2024

(54) VEHICLE POWER SUPPLY SYSTEM

(71) Applicant: DENSO CORPORATION, Kariya (JP)

(72) Inventor: Shigeo Hirashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/585,969

(22) Filed: Sep. 27, 2019

(65) Prior Publication Data

US 2020/0023795 A1 Jan. 23, 2020

Related U.S. Application Data

(63) Continuation of application No. PCT/JP2018/012434, filed on Mar. 27, 2018.

(30) Foreign Application Priority Data

Mar. 31, 2017 (JP) .................................. 2017-069849

(51) Int. Cl.
*B60L 1/00* (2006.01)
*B60K 6/28* (2007.10)
(Continued)

(52) U.S. Cl.
CPC ...... *B60L 1/00* (2013.01); *B60K 6/28* (2013.01); *B60L 50/60* (2019.02); *B60R 16/033* (2013.01);
(Continued)

(58) Field of Classification Search
CPC . B60L 1/00; B60L 50/60; B60L 50/70; B60K 6/28; B60R 16/033; H02J 7/00;
(Continued)

(56) References Cited

U.S. PATENT DOCUMENTS

| 6,507,506 B1* | 1/2003 | Pinas | .................... B60L 3/0046 323/225 |
| 2003/0057705 A1* | 3/2003 | Kusumi | ................... B60K 6/48 290/40 C |

(Continued)

FOREIGN PATENT DOCUMENTS

| JP | 2008-005622 A | 1/2008 |
| JP | 2008005622 A * | 1/2008 |

(Continued)

OTHER PUBLICATIONS

Jun. 26, 2018 International Search Report issued in International Patent Application No. PCT/JP2018/012434.

*Primary Examiner* — Rexford N Barnie
*Assistant Examiner* — Swarna N Chowdhuri
(74) *Attorney, Agent, or Firm* — Oliff PLC

(57) ABSTRACT

A vehicle power supply system mounted on a vehicle is provided. The vehicle power supply system includes a main battery, a power converting apparatus configured to convert DC power of the main battery into AC power, a switch configured to switch a state between energization and cutoff between the main battery and the power converting apparatus, a first DC-DC converter connected to a power supply wiring between the switch and the power converting apparatus, and a second DC-DC converter connected to a power supply wiring between the switch and the main battery. The first DC-DC converter and the second DC-DC converter are mounted at positions distant from each other in the vehicle.

16 Claims, 3 Drawing Sheets

(51) Int. Cl.
  *B60L 50/60* (2019.01)
  *B60R 16/033* (2006.01)
  *H02J 7/00* (2006.01)
  *B60L 50/70* (2019.01)

(52) U.S. Cl.
  CPC ............... *H02J 7/00* (2013.01); *B60L 50/70* (2019.02); *B60Y 2200/91* (2013.01); *B60Y 2200/92* (2013.01); *B60Y 2400/61* (2013.01); *H02J 2207/20* (2020.01)

(58) Field of Classification Search
  CPC ............. H02J 2207/20; B60Y 2200/91; B60Y 2200/92; B60Y 2400/61
  USPC ........................................................ 307/9.1
  See application file for complete search history.

(56) References Cited

U.S. PATENT DOCUMENTS

| | | | | |
|---|---|---|---|---|
| 2010/0006360 A1* | 1/2010 | Kishimoto | ............. | B60K 6/547 180/65.21 |
| 2013/0162032 A1* | 6/2013 | Matt | ................. | B60L 53/14 307/10.1 |
| 2014/0077735 A1* | 3/2014 | Shinohara | ............... | B60L 50/16 310/68 R |
| 2016/0144725 A1* | 5/2016 | Nozawa | ................ | B60L 15/007 307/10.1 |

FOREIGN PATENT DOCUMENTS

| | | |
|---|---|---|
| JP | 2010-036594 A | 2/2010 |
| JP | 2016-116353 A | 6/2016 |
| JP | 2016-116362 A | 6/2016 |
| JP | 2016-132402 A | 7/2016 |

\* cited by examiner

VEHICLE POWER SUPPLY SYSTEM

CROSS-REFERENCE TO RELATED APPLICATION

The present application is a continuation application of International Application No. PCT/JP2018/012434, filed on Mar. 27, 2018, which claims priority to Japanese Patent Application No. 2017-69849 filed on Mar. 31, 2017, the entire content of which is incorporated herein by reference.

TECHNICAL FIELD

The present disclosure relates to a vehicle power supply system mounted on a vehicle.

BACKGROUND

There is, for example, a vehicle power supply system mounted on a vehicle such as an electric vehicle, a hybrid vehicle and a fuel cell vehicle. As a vehicle power supply system, there is a system including an inverter which converts DC power of a main battery into AC power, and a DC-DC converter which steps down DC power of the main battery. Further, a switch which switches a state between energization and non-energization between the main battery and the inverter is provided between the main battery and the inverter.

SUMMARY

One aspect of the present disclosure is a vehicle power supply system mounted on a vehicle including a main battery, a power converting apparatus configured to convert DC power of the main battery into AC power, a switch configured to switch a state between energization and cutoff between the main battery and the power converting apparatus, a first DC-DC converter connected to a power supply wiring between the switch and the power converting apparatus, and a second DC-DC converter connected to a power supply wiring between the switch and the main battery.

The first DC-DC converter and the second DC-DC converter are mounted at positions distant from each other in the vehicle, and one of the first DC-DC converter and the second DC-DC converter is mounted outside the vehicle interior, and the other is mounted inside the vehicle interior in the vehicle.

Another aspect of the present disclosure is a vehicle power supply system mounted on a vehicle including a main battery, a power converting apparatus configured to convert DC power of the main battery into AC power, a switch configured to switch a state between energization and cutoff between the main battery and the power converting apparatus, a first DC-DC converter connected to a power supply wiring between the switch and the power converting apparatus, and a second DC-DC converter connected to a power supply wiring between the switch and the main battery.

The first DC-DC converter and the second DC-DC converter are mounted at positions distant from each other in the vehicle, and at least one of the first DC-DC converter and the second DC-DC converter is a bidirectional DC-DC converter.

BRIEF DESCRIPTION OF THE DRAWINGS

The above-described and other objects, features and advantages of the present disclosure will become more apparent by reference to the following description in conjunction with accompanying drawings, in which.

DETAILED DESCRIPTION OF THE PREFERRED EMBODIMENTS

Figure 1:
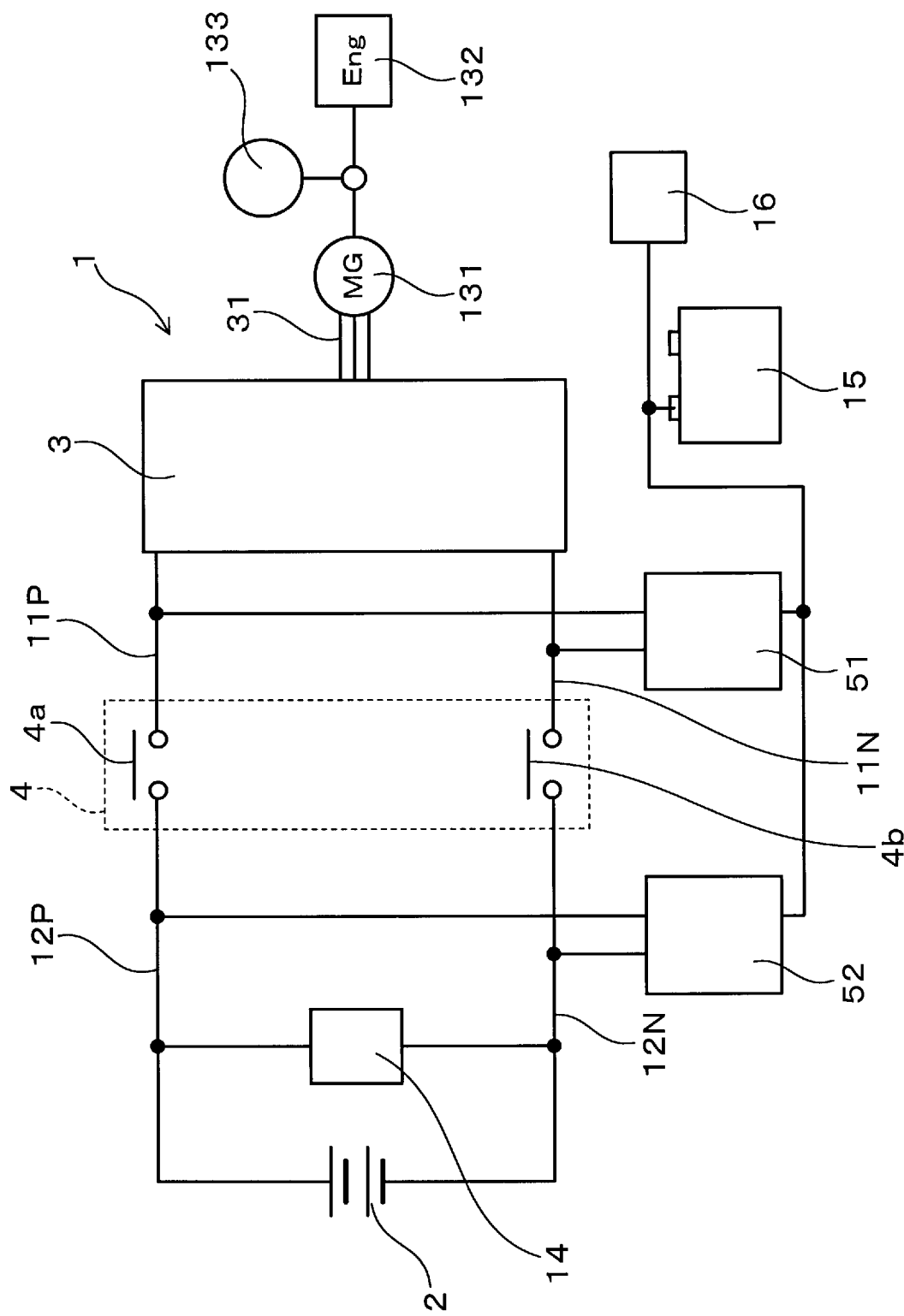
FIG. 1 is a circuit diagram of a vehicle power supply system in Embodiment 1.

JP 2016-132402 A discloses a power supply system including a first DC-DC converter which is connected to a power supply wiring between a switch and an inverter, and a second DC-DC converter which is connected to a power supply wiring between a main battery and the switch.

By the power supply system having a configuration as described above, even in a case where the switch fails, it is possible to supply power to a sub-battery using the second DC-DC converter. Further, also in a case where one of the first DC-DC converter and the second DC-DC converter fails, it is possible to supply power to the sub-battery via the other DC-DC converter.

Even in the above-described power supply system, in a case where both the first DC-DC converter and the second DC-DC converter fail, power cannot be supplied to the sub-battery, which will result in the vehicle stopping. Further, not only in a case where the DC-DC converter itself fails, but also in a case where a wiring between the DC-DC converter and other equipment is disconnected, the vehicle will stop.

Possible causes of failures of the DC-DC converter can include, for example, vehicle collision, flooding, influence of strong external radio waves, or the like. Meanwhile, in a case where two DC-DC converters are mounted on a vehicle, it is considered that the DC-DC converters are mounted at the same position in terms of wiring, or the like. Given the causes of failures as described above, a situation is conceivable where the two DC-DC converters both fail.

The present disclosure is directed to providing a power supply system which can easily maintain a state where a vehicle can operate even in the emergency.

One aspect of the present disclosure is a vehicle power supply system mounted on a vehicle including a main battery, a power converting apparatus configured to convert DC power of the main battery into AC power, a switch configured to switch a state between energization and cutoff between the main battery and the power converting apparatus, a first DC-DC converter connected to a power supply wiring between the switch and the power converting apparatus, and a second DC-DC converter connected to a power supply wiring between the switch and the main battery.

The first DC-DC converter and the second DC-DC converter are mounted at positions distant from each other in the vehicle, and one of the first DC-DC converter and the second DC-DC converter is mounted outside the vehicle interior, and the other is mounted inside the vehicle interior in the vehicle.

Another aspect of the present disclosure is a vehicle power supply system mounted on a vehicle including a main battery, a power converting apparatus configured to convert DC power of the main battery into AC power, a switch configured to switch a state between energization and cutoff between the main battery and the power converting apparatus, a first DC-DC converter connected to a power supply wiring between the switch and the power converting apparatus, and a second DC-DC converter connected to a power supply wiring between the switch and the main battery.

The first DC-DC converter and the second DC-DC converter are mounted at positions distant from each other in the vehicle, and at least one of the first DC-DC converter and the second DC-DC converter is a bidirectional DC-DC converter.

In the above-described vehicle power supply system, the first DC-DC converter and the second DC-DC converter are mounted at positions distant from each other in the vehicle. Therefore, a situation is likely to be avoided where the two DC-DC converters both fail. Further, because at least one of the first DC-DC converter and the second DC-DC converter provided as described above functions, it is possible to maintain a state where the vehicle can operate. Accordingly, a state where the vehicle can operate is likely to be maintained even in the emergency.

As described above, according to the above-described aspect, it is possible to provide a power supply system which can easily maintain a state where the vehicle can operate even in the emergency.

Embodiment 1

An embodiment according to a vehicle power supply system will be described with reference to FIG. 1 to FIG. 3.

A vehicle power supply system 1 of the present embodiment is a power supply system mounted on a vehicle.

As illustrated in FIG. 1, the vehicle power supply system 1 includes a main battery 2, a power converting apparatus 3, switches 4a and 4b, a first DC-DC converter 51, and a second DC-DC converter 52.

The power converting apparatus 3 converts DC power of the main battery 2 into AC power. The switches 4a and 4b switch a state between energization and cutoff between the main battery 2 and the power converting apparatus 3. The first DC-DC converter 51 is connected to power supply wirings 11P and 11N between the switches 4a and 4b and the power converting apparatus 3. The second DC-DC converter 52 is connected to power supply wirings 12P and 12N between the switches 4a and 4b and the main battery 2.

Figure 2:
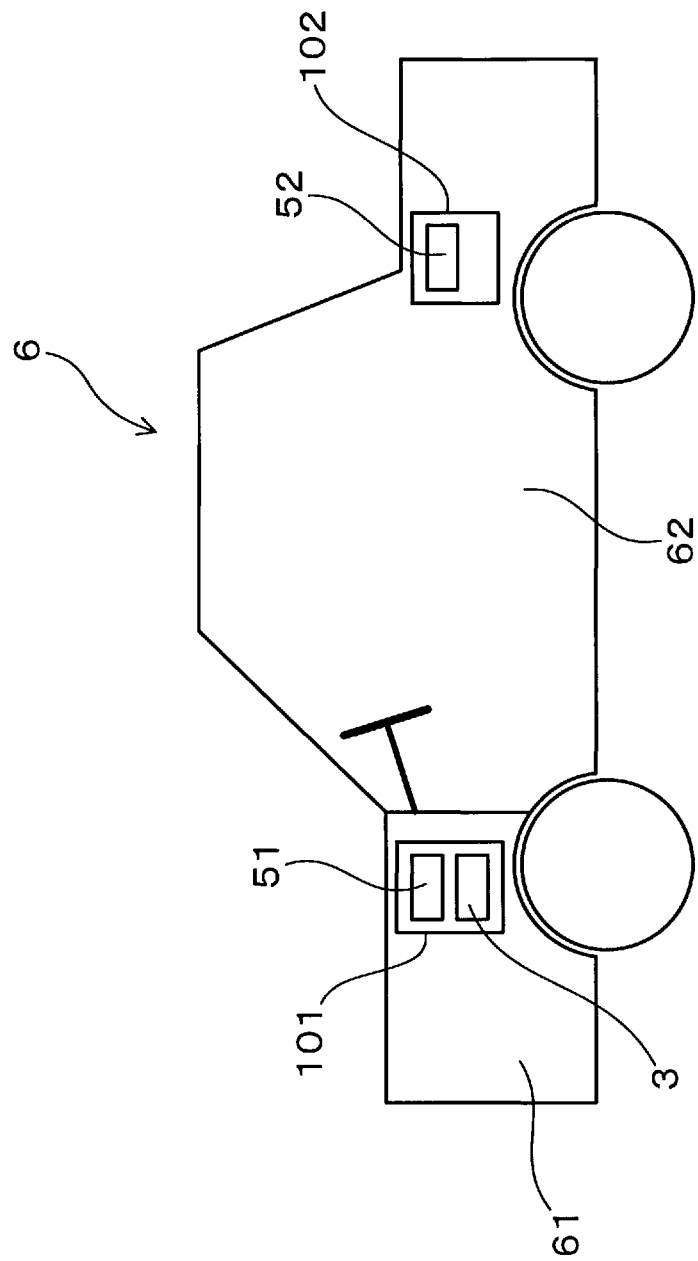
FIG. 2 is an explanatory diagram illustrating positions where a first DC-DC converter and a second DC-DC converter are mounted on a vehicle in Embodiment 1.

As illustrated in FIG. 2, the first DC-DC converter 51 and the second DC-DC converter 52 are mounted at positions distant from each other in a vehicle 6.

Specifically, one of the first DC-DC converter 51 and the second DC-DC converter 52 is mounted in an engine compartment 61 of the vehicle 6, and another one is mounted at a position different from the engine compartment 61 of the vehicle 6. More specifically, one of the first DC-DC converter 51 and the second DC-DC converter 52 is mounted in the engine compartment 61, and the other one is mounted inside a vehicle interior 62 of the vehicle 6.

In the present embodiment, the first DC-DC converter 51 is mounted in the engine compartment 61, and the second DC-DC converter 52 is mounted inside the vehicle interior 62.

Here, the vehicle interior 62 includes not only an occupant space (so-called cabin) where passengers get in, but a trunk, luggage space, space between a cabin and the trunk or the luggage space, or the like. FIG. 2 illustrates an aspect where the second DC-DC converter 52 is mounted in space between the cabin and the trunk.

Further, the second DC-DC converter 52 is disposed on a rear side from a center of its entire length in a longitudinal direction of the vehicle 6. Meanwhile, the first DC-DC converter 51 is disposed on a front side from the center of the vehicle 6.

A specific position where the second DC-DC converter 52 is disposed inside the vehicle interior 62 is not limited to the above-described position, and may be, for example, a lower part of a seat, a position between a driver's seat and a passenger's seat, a center console, or the like. Alternatively, the second DC-DC converter 52 may be disposed in the trunk, the luggage space, or the like.

The vehicle power supply system 1 of the present embodiment is mounted on a hybrid vehicle.

As illustrated in FIG. 1, the hybrid vehicle includes AC rotating electrical machine 131, and an engine 132. Further, the hybrid vehicle is configured to drive driving wheels 133 by at least one of the rotating electrical machine 131 and the engine 132.

The power converting apparatus 3 is connected to the AC rotating electrical machine 13 via an output wiring 31. Further, the power converting apparatus 3 is configured to be able to convert DC power supplied from power supply wirings 11P and 11N into AC power to drive the rotating electrical machine 13 via the output wiring 31. That is, the power converting apparatus 3 includes an inverter.

The main battery 2 is connected to the power converting apparatus 3 with positive power supply wirings 12P and 11P and negative power supply wirings 12N and 11N. A switch 4a is provided at the positive power supply wirings 12P and 11P, and a switch 4b is provided at the negative power supply wirings 12N and 11N. That is, the switch 4a switches a state between energization and cutoff at the positive power supply wirings 12P and 11P. The switch 4b switches a state between energization and cutoff at the negative power supply wirings 12N and 11N. The two switches 4a and 4b are integrated to constitute a system main relay 4 (hereinafter, referred to as an "SMR 4").

A battery monitoring unit 14 which monitors and controls the main battery 2 is connected to the power supply wirings 12P and 12N between the main battery 2 and the switches 4a and 4b.

The first DC-DC converter 51 is connected to a pair of positive and negative power supply wirings 11P and 11N between the switches 4a and 4b and the power converting apparatus 3. A sub-battery 15 is connected to the first DC-DC converter 51 on the opposite side of the power supply wirings 11P and 11N. Further, the first DC-DC converter 51 can step down DC power of the main battery 2 and supply the power to the sub-battery 15.

Further, the first DC-DC converter 51 can also step up DC power of the sub-battery 15 and supply the power to the power supply wirings 11P and 11N. The power supplied from the first DC-DC converter 51 to the power supply wirings 11P and 11N is supplied to the power converting apparatus 3 and is used for driving the rotating electrical machine 131, or is used for charging the main battery 2.

In this manner, the first DC-DC converter 51 is a bidirectional DC-DC converter which is configured to be able to perform step-down from the power supply wiring 11P and 11N side to the sub-battery 15 side and perform step-up from the sub-battery 15 side to the power supply wiring 11P and 11N side.

The second DC-DC converter 52 is connected to a pair of positive and negative power supply wirings 12P and 12N between the main battery 2 and the switches 4a and 4b. The sub-battery 15 is connected to the second DC-DC converter 52 on the opposite side of the power supply wirings 12P and 12N. That is, both the first DC-DC converter 51 and the second DC-DC converter 52 are connected to the sub-battery 15.

The second DC-DC converter 52 can also step down DC power of the main battery and supply the power to the sub-battery 15.

A lower voltage side of the second DC-DC converter 52 is connected to a lower voltage side of the first DC-DC converter 51. That is, the first DC-DC converter 51 and the second DC-DC converter 52 are connected to each other on their lower voltage sides and are connected to the sub-battery 15.

In a similar manner to the first DC-DC converter 51, the second DC-DC converter 52 may be a bidirectional DC-DC converter or may be a DC-DC converter which performs only step-down.

The sub-battery 15 is a battery of which voltage is lower than a voltage of the main battery 2. For example, a voltage of the main battery 2 is approximately 300 V, while a voltage of the sub-battery 15 is approximately 12 V. The sub-battery 15 is electrically connected to auxiliary machine 16 such as, a power steering, an air conditioner and a lamp. Further, power of the sub-battery 15 is also used for actuating an ECU (electronic control unit) for a vehicle and activating a hybrid system.

Further, output power of the first DC-DC converter 51 is different from output power of the second DC-DC converter 52. In the present embodiment, the output power of the second DC-DC converter 52 is lower than the output power of the first DC-DC converter 51. Further, during normal operation, the sub-battery 15 is charged mainly by the first DC-DC converter 51. The second DC-DC converter 52 performs auxiliary charging of the sub-battery 15. Alternatively, it is also possible to perform control so as to prevent the second DC-DC converter 52 from operating during normal operation, so as to be used as an emergency backup converter.

Figure 3:
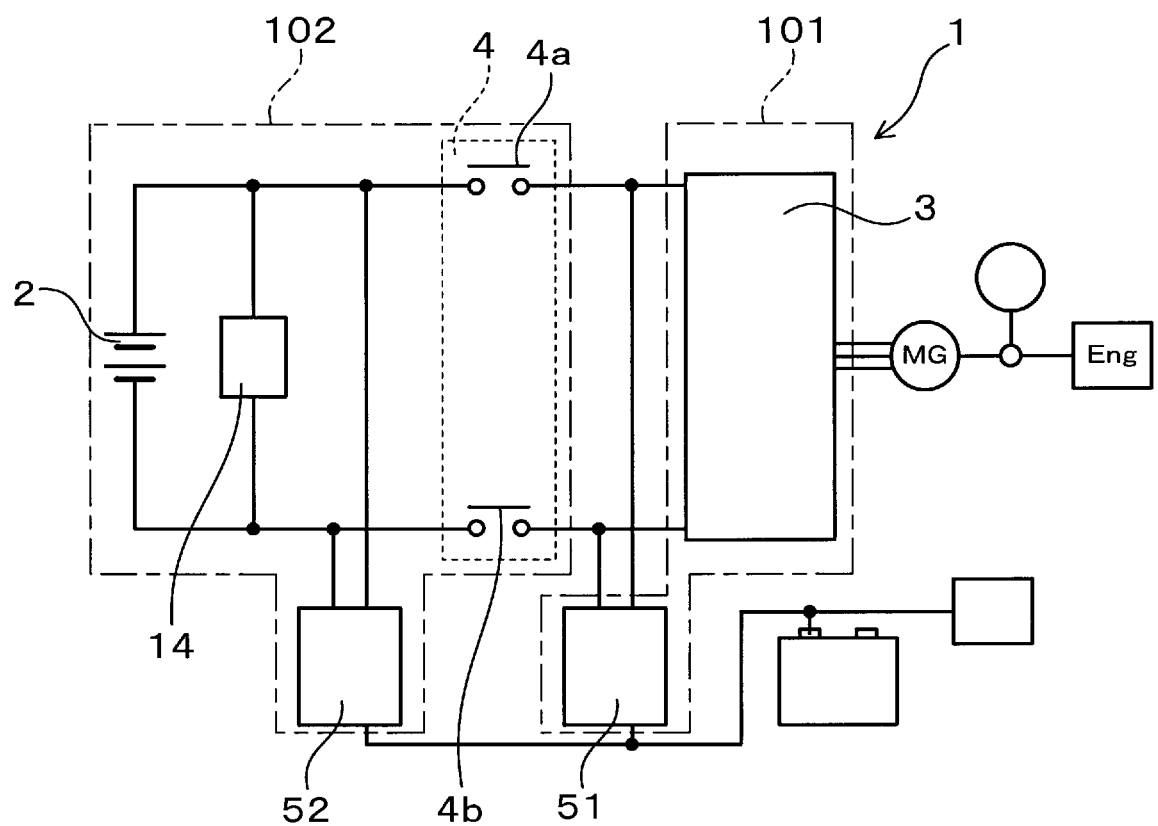
FIG. 3 is a circuit diagram of the vehicle power supply system, explaining configurations of a power control unit and a battery pack in Embodiment 1.

As illustrated in FIG. 3, the first DC-DC converter 51 is provided integrally with the power converting apparatus 3. For example, the first DC-DC converter 51 can constitute a power control unit 101 with the power converting apparatus 3 and can be stored in one chassis.

Further, the second DC-DC converter 52 is provided integrally with the main battery 2. For example, the second DC-DC converter 52 can be mounted inside a battery pack 102 together with the main battery 2. In the present embodiment, in addition to the main battery 2 and the second DC-DC converter 52, the SMR 4 and the battery monitoring unit 14 are also mounted in the battery pack 102. That is, the second DC-DC converter 52 is provided integrally also with the switches 4a and 4b and the battery monitoring unit 14.

Further, as illustrated in FIG. 2, the power control unit 101 is mounted in the engine compartment 61 of the vehicle 6. Further, the battery pack 102 is mounted in the vehicle interior 62 of the vehicle 6.

Functions and effects of the present embodiment will be described next.

In the above-described vehicle power supply system 1, the first DC-DC converter 51 and the second DC-DC converter 52 are mounted at positions distant from each other in the vehicle 6. Therefore, a situation is likely to be avoided where the two DC-DC converters both fail. That is, if the two DC-DC converters are mounted at the same position in the vehicle 6, for example, in a case where there is vehicle collision, flooding, influence of strong external radio waves, or the like, it is highly likely that the two DC-DC converters both fail.

In contrast, by the first DC-DC converter 51 and the second DC-DC converter 52 being mounted on the vehicle 6 as described above, it is possible to reduce a possibility that the two DC-DC converters both fail. Further, it is also easier to avoid disconnection of wirings between the DC-DC converters and other equipment than in a case where the two DC-DC converters are mounted at the same position.

Further, by at least one of the first DC-DC converter 51 and the second DC-DC converter 52 provided as described above functioning, it is possible to maintain a state where the vehicle 6 can operate. Therefore, it is easy to maintain a state where the vehicle 6 can operate also in the emergency.

For example, a case where the first DC-DC converter 51 fails will be considered.

In this case, it is possible to charge the sub-battery 15 via the second DC-DC converter 52.

That is, high-voltage DC power of the main battery 2 is stepped down at the second DC-DC converter 52 and supplied to the sub-battery 15. By this means, it is possible to continue vehicle operation without power of the sub-battery 15 becoming insufficient.

In the case where the second DC-DC converter 52 fails, it is possible to charge the sub-battery 15 via the first DC-DC converter 51.

Further, in the case where the SMR 4 fails, and at least one of the switches 4a and 4b is put into a state where energization is impossible, power is supplied from the main battery 2 to the power converting apparatus 3 via the second DC-DC converter 52 and the first DC-DC converter 51. By this means, the vehicle 6 can operate. Note that the sub-battery 15 can be charged via the second DC-DC converter 52.

One of the first DC-DC converter 51 and the second DC-DC converter 52 is mounted in the engine compartment 61 of the vehicle 6, and the other is mounted at a position different from the engine compartment 61 in the vehicle 6. By this means, it is possible to avoid the two DC-DC converters from both failing, more effectively.

One of the first DC-DC converter 51 and the second DC-DC converter 52 is mounted in the engine compartment 61, and the other is mounted inside the vehicle interior 62. Because inside the vehicle interior 62 is an environment with relatively less causes of failures, it is possible to suppress a failure of the DC-DC converter mounted inside the vehicle interior 62. As a result, it is possible to prevent a situation where the two DC-DC converters both fail, more effectively.

Particularly, in the present embodiment, the first DC-DC converter 51 is mounted in the engine compartment 61, and the second DC-DC converter 52 is mounted inside the vehicle interior 62. By this means, it is possible to easily simplify, or the like, wirings between the DC-DC converters and other equipment while securing mountability of the two DC-DC converters on the vehicle 6. That is, because the power converting apparatus 3 and the rotating electrical machine 131 are normally mounted in the engine compartment 61, by the first DC-DC converter 51 connected to the power converting apparatus 3 being mounted in the engine compartment 61, it is possible to simplify wirings. Meanwhile, because the main battery 2 is typically mounted inside the vehicle interior 62, by the second DC-DC converter 52 connected to the main battery 2 being mounted inside the vehicle interior 62, it is possible to simplify wirings.

Further, the first DC-DC converter 51 is provided integrally with the power converting apparatus 3. By this means, it is possible to shorten a wiring between the first DC-DC converter 51 and the power converting apparatus 3. It is therefore possible to reduce noise due to this wiring. Further, it is possible to also reduce a possibility of disconnection, or the like, between the first DC-DC converter 51 and the power converting apparatus 3.

The second DC-DC converter 52 is provided integrally with the main battery 2, the switches 4a and 4b and the battery monitoring unit 14. By this means, it is possible to shorten wirings between the second DC-DC converter 51, and the main battery 2, the switches 4a and 4b and the battery monitoring unit 14. It is therefore possible to reduce noise due to these wirings. Further, it is also possible to reduce a possibility of disconnection, or the like, of these wirings.

The output power of the first DC-DC converter 51 is different from the output power of the second DC-DC converter 52. Specifically, the output power of the second DC-DC converter 52 is smaller than the output power of the first DC-DC converter 51. By this means, it is possible to make a physical size of the second DC-DC converter 52 smaller, and, as a result, it is possible to improve mountability of the second DC-DC converter 52 on the vehicle 6. Particularly, when the second DC-DC converter 52 is mounted inside the vehicle interior 62, it is possible to improve a degree of freedom of arrangement. Further, by the output power of the second DC-DC converter 52 being made smaller, it can be possible to simplify or eliminate cooling means of the second DC-DC converter 52. For example, it is possible to cool the second DC-DC converter 52 using an air-cooling scheme while the first DC-DC converter 51 is cooled using a liquid-cooling scheme. As a result, it is possible to further improve mountability of the second DC-DC converter 52.

As described above, according to the present embodiment, it is possible to provide a power supply system which can easily maintain a state where a vehicle can operate even in an emergency.

The present disclosure is not limited to the above-described embodiment, and can be applied to various kinds of embodiments within a range not deviating from the gist of the present disclosure.

For example, while, in the above-described embodiment, the vehicle power supply system mounted on a hybrid vehicle has been described, for example, the present disclosure can be also applied to a vehicle power supply system mounted on an electric vehicle, a fuel cell vehicle, or the like.

Further, while, in the above-described embodiment, a configuration has been described where the second DC-DC converter is provided integrally with the main battery, the SMR and the battery control unit, the second DC-DC converter may be provided integrally with one or two out of the main battery, the SMR and the battery control unit.

Further, while, in the above-described embodiment, the vehicle power supply system including two DC-DC converters of the first DC-DC converter and the second DC-DC converter has been illustrated, the present disclosure can be also applied to a vehicle power supply system including three or more DC-DC converters.

While the present disclosure has been described in accordance with the embodiment, it is understood that the present disclosure is not limited to the embodiment and structures. The present disclosure incorporates various modified examples and modifications within a range of equivalency. In addition, various combinations and forms, further, other combinations and forms including only one element, equal to or greater than or equal to or less than mentioned previously falls within the scope and a range of idea of the present disclosure.

What is claimed is:

1. A vehicle power supply system mounted on a vehicle, the vehicle power supply system comprising:
   a battery pack including a main battery;
   a power converting apparatus configured to convert DC power of the main battery into AC power;
   a switch configured to switch a state between energization and cutoff between the main battery and the power converting apparatus;
   a first DC-DC converter connected to a power supply wiring between the switch and the power converting apparatus, the first DC-DC converter being configured to step up DC power to the main battery, and the first DC-DC converter being located integrally with the power converting apparatus within a single casing; and
   a second DC-DC converter connected to a power supply wiring between the switch and the main battery, the second DC-DC converter being located integrally with the main battery inside the battery pack, wherein:
      the first DC-DC converter and the second DC-DC converter are mounted at positions distant from each other on the vehicle,
      one of the first DC-DC converter and the second DC-DC converter is mounted outside a vehicle interior of the vehicle, and the other is mounted inside the vehicle interior in the vehicle, and
      a sub-battery is connected to the first DC-DC converter and the second DC-DC converter in series with the first DC-DC converter being positioned between the sub-battery and the second DC-DC converter in the series.

2. The vehicle power supply system according to claim 1, wherein at least one of the first DC-DC converter and the second DC-DC converter is a bidirectional DC-DC converter.

3. The vehicle power supply system according to claim 1, wherein the first DC-DC converter and the second DC-DC converter are mounted at positions on opposite sides of the vehicle relative to a cabin of the vehicle.

4. The vehicle power supply system according to claim 3, wherein the one of the first DC-DC converter and the second DC-DC converter, which is mounted outside the vehicle interior, is mounted in an engine compartment, and the other is mounted inside the vehicle interior of the vehicle.

5. The vehicle power supply system according to claim 4, wherein the first DC-DC converter is mounted in the engine compartment, and the second DC-DC converter is mounted inside the vehicle interior.

6. The vehicle power supply system according to claim 1, wherein the second DC-DC converter is provided integrally with the switch.

7. The vehicle power supply system according to claim 1, wherein the second DC-DC converter is provided in the battery pack with a battery monitor configured to monitor and control the main battery, the battery monitor being positioned outside of and spaced from the first and second DC-DC converters.

8. The vehicle power supply system according to claim 1, wherein output power of the first DC-DC converter is different from output power of the second DC- DC converter.

9. The vehicle power supply system according to claim 8, wherein the output power of the second DC-DC converter is smaller than the output power of the first DC-DC converter.

10. A vehicle power supply system mounted on a vehicle, the vehicle power supply system comprising:
   a battery pack including a main battery;

a power converting apparatus configured to convert DC power of the main battery into AC power;

a switch configured to switch a state between energization and cutoff between the main battery and the power converting apparatus;

a first DC-DC converter connected to a power supply wiring between the switch and the power converting apparatus, the first DC-DC converter being configured to step up DC power to the power converting apparatus and to the main battery, and the first DC-DC converter being located integrally with the power converting apparatus within a single casing; and a second DC-DC converter connected to a power supply wiring between the switch and the main battery, the second DC-DC converter being located integrally with the main battery inside the battery pack, wherein:

the first DC-DC converter and the second DC-DC converter are mounted at positions distant from each other in the vehicle, such that one of the first DC-DC converter and the second DC-DC converter is mounted in an engine compartment, and the other is mounted inside a vehicle interior of the vehicle, at least one of the first DC-DC converter and the second DC-DC converter is a bidirectional DC-DC converter, and a sub-battery is connected to the first DC-DC converter and the second DC-DC converter in series with the first DC-DC converter being positioned between the sub-battery and the second DC-DC converter in the series.

11. The vehicle power supply system according to claim 10, wherein the first DC-DC converter and the second DC-DC converter are mounted at positions on opposite sides of the vehicle relative to a cabin of the vehicle.

12. The vehicle power supply system according to claim 11, wherein the first DC-DC converter is mounted in the engine compartment, and the second DC-DC converter is mounted inside the vehicle interior.

13. The vehicle power supply system according to claim 10, wherein the second DC-DC converter is provided integrally with the switch.

14. The vehicle power supply system according to claim 10, wherein the second DC-DC converter is provided in the battery pack with a battery monitor configured to monitor and control the main battery, the battery monitor being positioned outside of and spaced from the first and second DC-DC converters.

15. The vehicle power supply system according to claim 10, wherein output power of the first DC-DC converter is different from output power of the second DC- DC converter.

16. The vehicle power supply system according to claim 15, wherein the output power of the second DC-DC converter is smaller than the output power of the first DC-DC converter.

* * * * *